United States Patent [19]

Takahashi et al.

[11] Patent Number: 5,447,661
[45] Date of Patent: Sep. 5, 1995

[54] CONDUCTIVE SILICONE RUBBER COMPOSITION

[75] Inventors: Masaharu Takahashi; Tomiyoshi Tsuchida, both of Annaka; Hiroshi Matsukawa, Takasaki, all of Japan

[73] Assignee: Shin-Etsu Chemical Co., Ltd., Tokyo, Japan

[21] Appl. No.: 229,506

[22] Filed: Apr. 12, 1994

[30] Foreign Application Priority Data

Apr. 13, 1993 [JP] Japan ................... 5-109864

[51] Int. Cl.$^6$ ........................ H01B 1/04; H01B 1/24
[52] U.S. Cl. ..................... 252/511; 528/10; 528/12; 528/24
[58] Field of Search ............. 252/511; 528/10, 12, 528/24

[56] References Cited

U.S. PATENT DOCUMENTS

| | | | |
|---|---|---|---|
| 3,714,204 | 1/1973 | Lamont | 260/375 B |
| 3,776,885 | 12/1973 | MacLeay | 260/46.5 G |
| 4,273,697 | 6/1981 | Sumimura et al. | 260/37 B |
| 4,728,687 | 3/1988 | Watanabe et al. | 524/493 |
| 4,980,384 | 12/1990 | Takahashi et al. | 521/91 |
| 5,006,372 | 4/1991 | Wolfer et al. | 427/387 |
| 5,053,167 | 10/1991 | Kawaguchi | 252/511 |
| 5,073,583 | 12/1991 | Broderick | 524/91 |
| 5,082,596 | 1/1992 | Fakuda et al. | 252/511 |
| 5,214,074 | 5/1993 | Takahashi et al. | 521/88 |
| 5,294,373 | 3/1994 | Takahashi et al. | 252/502 |
| 5,306,766 | 4/1994 | Omura et al. | 524/588 |

FOREIGN PATENT DOCUMENTS

| | | |
|---|---|---|
| 0493112 | 7/1992 | European Pat. Off. |
| 2204657 | 5/1974 | France |
| 1932475 | 7/1970 | Germany |

*Primary Examiner*—Paul Lieberman
*Assistant Examiner*—Gregory R. Delcotto
*Attorney, Agent, or Firm*—Millen, White, Zelano & Branigan

[57] ABSTRACT

A compound having a group —N=N— is added to a conductive silicone rubber composition comprising an organopolysiloxane, conductive carbon black, and an organic peroxide. The composition allows for atmospheric hot air vulcanization with the aid of an organic peroxide irrespective of the inclusion of carbon black and is significantly improved in shelf stability. The conductive silicone rubber resulting therefrom is free of voids or surface tack and has improved heat resistance and conductivity.

21 Claims, No Drawings

CONDUCTIVE SILICONE RUBBER COMPOSITION

BACKGROUND OF THE INVENTION

1. Field of the Invention

This invention relates to a conductive silicone rubber composition containing conductive carbon black, and more particularly, to a conductive silicone rubber composition which has a superior storage stability and cures into a satisfactory rubber product through atmospheric hot air vulcanization (HAV).

2. Prior Art

Most rubbery materials are electric insulators. A number of conductive rubbers are available as mixtures of rubbery material and conductive agents. For example, rubbers having carbon black blended therein to provide an electric resistivity of from $10^5$ to $10\Omega$-cm are conductive rubbers which are used in various applications.

Silicone rubber is also widely used as electrically insulating rubber because of its high-temperature resistance, low-temperature resistance and weatherability. It can also be used as conductive silicone rubber by adding conductive agents like the other rubbery materials.

The conductive agents which are added to silicone rubber for imparting electric conductivity are typically carbon black, graphite, various metal powders such as silver, nickel, and copper, various non-conductive particles and short fibers surface treated with silver or similar metals, carbon fibers, and metallic fibers. By mixing these conductive agents, the resistivity of silicone rubber can be reduced to the order of $10^{10}$ to $10^{-3}\Omega$-cm depending on the type and amount of conductive agent without detracting from the inherent properties of silicone rubber. Among others, carbon black and metal powders such as silver and nickel are often used where it is desired to produce highly conductive silicone rubber having a resistivity of less than $10^5$ $\Omega$-cm. Carbon black is most often used because of cost.

However, only a limited vulcanization system is applicable to conductive silicone rubber compositions having blended therein acetylene black and other carbon black as a conductive agent when they are continuously molded as by extrusion molding and vulcanized into a length of article such as a seal, gasket and roll. More particularly, typical organic peroxide vulcanization fails to yield satisfactory molded products. If acyl series peroxides commonly used in atmospheric hot air vulcanization (HAV) of conventional silicone rubber compositions, for example, benzoyl peroxide and 2,4-dichlorobenzoyl peroxide are used in carbon black-containing systems, the carbon black acts to restrain vulcanization. If alkyl series peroxides, for example, dicumyl peroxide and di-tert-butyl peroxide are used in carbon black-containing systems, compression molding is permissible, but extrusion atmospheric hot air vulcanization fails to yield satisfactory products because the surface is vulcanized short due to the influence of oxygen in air.

For extrusion atmospheric hot air vulcanization of carbon black-containing silicone rubber compositions, an addition vulcanization approach was conventionally used in order to overcome the above-mentioned difficulty. This approach is to add a platinum series addition reaction catalyst to a mixture of an organopolysiloxane having an alkenyl group and an organohydrogenpolysiloxane having a silicon-attached hydrogen atom capable of addition reaction with the alkenyl group, thus inducing addition reaction curing.

This addition reaction curing approach, however, suffers from the problems of a limited shelf life and poisoning by catalyst poisons such as amines, sulfur and tin. This imposes a serious problem on molding. Typically conductive silicone rubber is used to mold a variety of articles, for example, electromagnetic radiation shielding gaskets, building gaskets, business machine conductive rolls (including charging rolls, transfer rolls, developing rolls, paper feed rolls and fixing rolls), and conductive calendered moldings (such as molded zebra connectors). If conductive silicone rubber is molded by conventional atmospheric hot air vulcanization (HAV), problems arise with respect to moldability and rubber quality. It was thus desired to overcome the above-mentioned problems.

One solution by the inventors is disclosed in Japanese Patent Application Kokai (JP-A) No. 43802/1993 by Shin-Etsu Chemical Co., Ltd. or corresponding USSN 07/812,285 and EP 0493112, which is incorporated herein by reference. Proposed therein is a conductive silicone rubber composition comprising (A) an organopolysiloxane of the general formula (1):

$$R_a{}^1SiO_{(4-a)/2} \tag{1}$$

wherein $R^1$ groups which may be identical or different are selected from substituted or unsubstituted monovalent hydrocarbon groups and letter a is a positive number of 1.90 to 2.05, (B) conductive carbon black, and (C) an organic peroxide of the general formula (2):

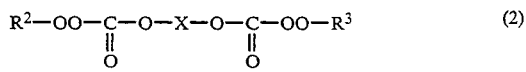
$$R^2-OO-\underset{\underset{O}{\|}}{C}-O-X-O-\underset{\underset{O}{\|}}{C}-OO-R^3 \tag{2}$$

wherein X is a group of formula (4) or (5):

$$-(CH_2)_m- \tag{4}$$

$$-CH_2-\underset{\underset{CH_3}{|}}{\overset{\overset{CH_3}{|}}{C}}-CH_2- \tag{5}$$

wherein m is an integer of 2 to 8, and $R^2$ and $R^3$ are independently a monovalent hydrocarbon group having 3 to 10 carbon atoms or a group $-SiR_3{}^4$ wherein $R^4$ is a methyl, ethyl or phenyl group.

This conductive silicone rubber composition can be extrusion or calender molded and satisfactorily vulcanized by atmospheric hot air vulcanization, that is, effectively molded and vulcanized into silicone rubber having good physical properties and conductivity.

Containing research works, we found that the previously proposed conductive silicone rubber composition exhibited satisfactory physical properties and workability immediately after its preparation, but experienced an increase of plasticity and scorching phenomenon with the lapse of time. There is a need for increasing the shelf stability of such a composition.

SUMMARY OF THE INVENTION

Therefore, an object of the present invention is to provide a novel and improved conductive silicone rubber composition which can be effectively molded and vulcanized into conductive silicone rubber having satisfactory physical properties by extrusion molding or calendering and HAV techniques and which has improved shelf stability.

We have found that the conductive silicone rubber composition of JP-A 43802/1993 can be improved by blending it with a compound having a group —N=N—. The resulting composition remains stable over a long period of shelf storage while maintaining the advantages of JP-A 43802/1993. We have also found that another variant of the organic peroxide of formula (2) is also useful in the composition.

According to the present invention, there is provided a conductive silicone rubber composition comprising (A) an organopolysiloxane of the general formula (1):

$$R_a^1 SiO_{(4-a)/2} \quad (1)$$

wherein $R^1$ groups which may be identical or different are selected from substituted or unsubstituted monovalent hydrocarbon groups and letter a is a positive number of 1.90 to 2.05, (B) conductive carbon black, (C) at least one member selected from organic peroxides of the general formulae (2) and (3):

$$R^2-OO-\underset{\underset{O}{\|}}{C}-O-X-O-\underset{\underset{O}{\|}}{C}-OO-R^3 \quad (2)$$

$$R^2-OO-\underset{\underset{O}{\|}}{C}-O-(C_2H_4O)_n-C_2H_4-O-\underset{\underset{O}{\|}}{C}-OO-R^3 \quad (3)$$

wherein X is a group of formula (4) or (5):

$$-(CH_2)_m- \quad (4)$$

$$-CH_2-\underset{\underset{CH_3}{|}}{\overset{\overset{CH_3}{|}}{C}}-CH_2- \quad (5)$$

wherein m is an integer of 2 to 8, $R^2$ and $R^3$ are independently a monovalent hydrocarbon group having 3 to 10 carbon atoms or a group —$SiR_3^4$ wherein $R^4$ is a methyl, ethyl or phenyl group, and letter n is an integer of 1 to 4, (D) at least one compound having a group —N=N—.

The conductive silicone rubber composition comprising an organopolysiloxane of formula (1), carbon black, an organic peroxide of formula (2) or (3), and a compound having a group —N=N— is extrusion molded or calendered while it can be effectively vulcanized by atmospheric hot air vulcanization or ultra-high frequency (UHF) vulcanization irrespective of the inclusion of conductive carbon black because the organic peroxide is not adversely affected by carbon black. The composition which does not rely on addition vulcanization eliminates any concern about catalyst poisons and is thus easy to handle. The composition is effectively moldable, experiences a small change of plasticity and no scorching phenomenon with the lapse of time after its preparation, and maintains stable workability over a long period of time. The composition cures into silicone rubber which has good conductivity and physical properties and is surface tack-free.

The present assignee (applicant) further proposed, in addition to the above-described conductive silicone rubber composition of U.S. Ser. No. 07/812,285, the following silicone rubber compositions in U.S. Ser. Nos. 07/915,176, 07/998,032 and 08/117,822.

U.S. Ser. No. 07/915,176 proposes a conductive silicone rubber composition comprising (A) an organopolysiloxane of the general formula (1):

$$R_a^1 SiO_{(4-a)/2} \quad (1)$$

wherein $R^1$ is independently selected from substituted or unsubstituted monovalent hydrocarbon groups and letter a is a positive number of 1.90 to 2.05, (B) conductive carbon black, (C) an organic peroxide of the general formula (2):

$$R^2-OO-\underset{\underset{O}{\|}}{C}-O-X-O-\underset{\underset{O}{\|}}{C}-OO-R^3 \quad (2)$$

wherein X is a group of the following formula (3) or (4):

$$-(CH_2)_n- \quad (3)$$

$$-CH_2-\underset{\underset{CH_3}{|}}{\overset{\overset{CH_3}{|}}{C}}-CH_2- \quad (4)$$

wherein n is an integer of 2 to 8, $R^2$ and $R^3$ each are a monovalent hydrocarbon group having 3 to 10 carbon atoms or a group of the following formula (5):

$$-SiR_3^4 \quad (5)$$

wherein $R^4$ is a methyl, ethyl or phenyl group, and (D) at least one additive selected from the group consisting of a fatty acid of the general formula (6):

$$R^5(COOH)_m \quad (6)$$

wherein $R^5$ is a hydrogen atom or a saturated or unsaturated, substituted or unsubstituted, monovalent hydrocarbon group having 1 to 30 carbon atoms and m is an integer of 1 to 10, an acid anhydride resulting from molecular condensation of the fatty acid, and an acid anhydride of the general formula (7):

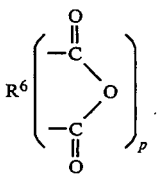

wherein $R^6$ is a saturated or unsaturated, substituted or unsubstituted, polyvalent hydrocarbon group having 1 to 30 carbon atoms and p is an integer of 1 to 3.

U.S. Ser. No. 07/998,032 proposes a method for producing a silicone rubber by curing a silicone rubber composition under anaerobic conditions, said silicone rubber composition comprising (A) an organopolysiloxane of the general formula (1):

$$R_a^1 SiO_{(4-a)/2} \quad (1)$$

wherein $R^1$ is independently selected from substituted or unsubstituted monovalent hydrocarbon radicals, and letter a is a positive number of from 1.90 to 2.05.

(B) an organic peroxide of the general formula (2):

$$R^2-OO-\underset{\underset{O}{\|}}{C}-O-X-O-\underset{\underset{O}{\|}}{C}-OO-R^3 \quad (2)$$

wherein X is a radical of the following formula (3), (4) or (5):

$$-(CH_2)_n- \quad (3)$$

$$-CH_2-\underset{\underset{CH_3}{|}}{\overset{\overset{CH_3}{|}}{C}}-CH_2- \quad (4)$$

$$-(C_2H_4O)_m-C_2H_4- \quad (5)$$

wherein n is an integer of 2 to 8 and m is an integer of 1 to 4,
$R^2$ and $R^3$ each are a monovalent hydrocarbon radical having 3 to 10 carbon atoms or a radical of the following formula (6):

$$-SiR_3^4 \quad (6)$$

wherein $R^4$ is an alkyl or aryl radical, and
(C) carbon black.

U.S. Ser. No. 08/117,822 proposes a conductive silicone rubber composition comprising (A) a compound including a first silicone rubber composition containing a first organopolysiloxane of the average compositional formula (1):

$$R_n^1 SiO_{(4-n)/2} \quad (1)$$

wherein $R^1$ is a substituted or unsubstituted monovalent hydrocarbon group, up to 95 mol % of the $R^1$ groups being methyl groups, and letter n is a positive number of 1.98 to 2.02, and conductive carbon black, and a second silicone rubber composition containing a second organopolysiloxane of the average compositional formula (2):

$$R_m^2 SiO_{(4-n)/2} \quad (2)$$

wherein $R^2$ is a substituted or unsubstituted monovalent hydrocarbon group, at least 98 mol % of the $R^2$ groups being methyl groups, and letter m is a positive number of 1.98 to 2.02, and (B) an organic peroxide of the general formula (3):

$$R^2-OO-\underset{\underset{O}{\|}}{C}-O-X-O-\underset{\underset{O}{\|}}{C}-OO-R^4 \quad (3)$$

wherein X is a group of formula (4) or (5):

$$-(CH_2)_a- \quad (4)$$

$$-CH_2-\underset{\underset{CH_3}{|}}{\overset{\overset{CH_3}{|}}{C}}-CH_2- \quad (5)$$

wherein a is an integer of 2 to 8,
$R^3$ and $R^4$ each are independently a monovalent hydrocarbon group having 3 to 10 carbon atoms or a group of formula (6):

$$-SiR_3^5 \quad (6)$$

wherein $R^5$ is a methyl, ethyl or phenyl group.
However, these proposals do not disclose and suggest the addition of component (D) according to the present invention.

DETAILED DESCRIPTION OF THE INVENTION

Component (A) of the conductive silicone rubber composition according to the present invention is an organopolysiloxane of the general formula (1).

$$R_a^1 SiO_{(4-a)/2} \quad (1)$$

In formula (1), $R^1$ which may be identical or different is selected from substituted or unsubstituted monovalent hydrocarbon groups preferably having 1 to 10 carbon atoms and letter a is a positive number of 1.90 to 2.05. Examples of the monovalent hydrocarbon group include alkyl groups such as methyl, ethyl, propyl and butyl groups; alkenyl groups such as vinyl, allyl and butenyl groups; aryl groups such as phenyl and tolyl groups; and substituted ones of these groups wherein some or all of the hydrogen atoms attached to carbon atoms are replaced by halogen atoms, cyano groups or the like, such as chloromethyl, chloropropyl, 3,3,3-trifuluoropropyl and 2-cyanoethyl groups.

These organopolysiloxanes should preferably have a linear molecular structure although a partially branched structure is acceptable. The organopolysiloxanes are often blocked with a triorganosilyl or hydroxyl group at the end of their molecular chain. Examples of the triorganosilyl group include trimethylsilyl, dimethylvinylsilyl, methylphenylvinylsilyl, methyldiphenylsilyl, methyldivinylsilyl, and trivinylsilyl groups. For further reducing surface tack, organopolysiloxanes blocked with a polyfunctional group such as $(CH_2=CH)_2RSi-$ and $(CH_2=CH)_3Si-$ wherein R has the same meaning as $R^1$ at either end of their molecular chain are preferred. The organopolysiloxanes should preferably have a viscosity of at least 300 centistokes (cs), preferably 100,000 cs or more at 25° C. although the degree of polymerization is not critical.

Component (B) is electroconductive carbon black which may be selected from various types of conductive carbon black commonly used in conductive rubber compositions. Examples include acetylene black, conducting furnace black (CF), super conducting furnace black (SCF), extra conducting furnace black (XCF), conducting channel black (CC), and furnace black and channel black heat treated at elevated temperatures of about 1500° C. More particularly, the acetylene black include Denka Acetylene Black manufactured by Denki Kagaku K.K., Shawinigan Acetylene Black manufactured by Shawinigan Chemical Co., the conducting furnace black includes Continex CF manufactured by Continental Carbon Co., and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp., and the conducting channel black includes Corax L manufactured by Degussa Co. Also useful are modified furnace blacks commercially available as Ketjen Black EC and Ketjen Black EC-600JD from Ketjen Black International. Preferred among others is acetylene black because it is more conductive due to a reduced impurity content and a well developed secondary structure. Also, Ketjen Black EC and Ketjen Black EC-600JD are useful because they have an extremely increased specific surface area so that sufficient conductivity is accomplished with a low loading.

The conductive carbon black may be used alone or in admixture of two or more types, preferably in an amount of from 5 to 100 parts, more preferably from 10 to 70 parts by weight per 100 parts by weight of organopolysiloxane (A). Less than 5 parts of carbon black would sometimes fail to provide desired electric conduction whereas more than 100 parts of carbon black would sometimes result in cured products having low mechanical strength.

Component (C) is an organic peroxide selected from organic peroxides of the general formulae (2) and (3) and a mixture thereof.

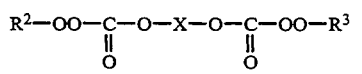  (2)

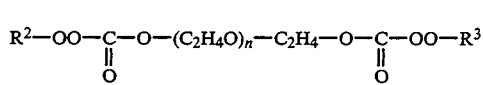  (3)

In formula (2), X is a group of formula (4):

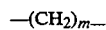  (4)

wherein m is an integer of 2 to 8 or a group of formula (5):

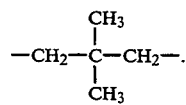  (5)

In formula (2) and (3), each of $R^2$ and $R^3$ which may be identical or different is a monovalent hydrocarbon group having 3 to 10 carbon atoms such as, for example, n-propyl, isopropyl, t-butyl, n-butyl, n-amyl, t-amyl, hexyl, heptyl, octyl, 2-ethylpropyl, 2-ethylbutyl, 2-ethylhexyl, and cumyl groups. Alternatively each of $R^2$ and $R^3$ is a trimethyl-silyl, triethylsilyl or triphenylsilyl group of the formula: $-SiR_3^4$ wherein $R^4$ is a methyl, ethyl or phenyl group.

In formula (3), letter n is an integer of 1 to 4.

The organic peroxide (C) is effective as a vulcanizing agent for organopolysiloxane (A) and preferably blended in an amount of about 0.1 to 5 parts, more preferably about 0.5 to 3 parts by weight per 100 parts by weight of organopolysiloxane (A). Often less than 0.1 part of the organic peroxide would be less effective for vulcanization, resulting in cured products which are practically unacceptable because of poor properties. More than 5 parts of the organic peroxide would sometimes adversely affect due to excess decomposition residue and be less cost effective.

In addition to the above-mentioned components (A) to (C), the conductive silicone rubber composition of the present invention has (D) at least one compound having a group $-N=N-$ blended therein for further improving shelf stability. Component (D) is the characteristic ingredient in the present composition. The addition of component (D) to the conductive silicone rubber composition comprising components (A), (B) and (C) can prevent an increase of plasticity or pseudocrosslinking and scorching phenomenon for a long period of time. The composition comprising components (A), (B) and (C) anaerobically cures with ease. The addition of component (D) can prevent such anaerobic curing.

Examples of the compound having a group $-N=N-$ include benzotriazole, benzotriazole-5-carboxylic acid, 1,2,3-benzotriazin- 4(3H) -one, N-(1H)-benzotriazol-1-ylmethyl-formamide, 1H -benzotriazol-1-ylmethyl-isocyanide, with benzotriazole being most preferred.

Component (D) is preferably blended in an amount of about 0.01 to 5 parts, more preferably about 0.1 to 2 parts by weight per 100 parts by weight of the total of components (A) to (C) although the amount of component (D) is not particularly limited. More than 5 parts by weight of component (D) would sometimes induce surface tack and exacerbate physical properties.

The conductive silicone rubber composition of the present invention contains components (A) to (D) as essential components and may further contain (E) an organic silicon compound having at least one hydrogen atom directly bonded to a silicon atom ($\equiv$SiH) in a molecule for the purpose of improving the surface tack of the cured product after HAV.

The organic silicon compounds used herein are often linear or cyclic and may contain a minor proportion of a branched chain structure or three-dimensional structure. Exemplary are methylhydrogenpolysiloxanes terminated with a trialkylsilyl group and having a varying degree of polymerization, organopentasiloxane represented by $Si[OSi(CH_3)_2H]_4$, siloxane copolymers comprised of $SiO_2$ and $(CH_3)_2HSiO_{1/2}$ units, copolymers of methylhydrogenpolysiloxane and dialkylsiloxane, polysilylalkylenesiloxane having a SiH bond, polysilanes, and polycarbosilanes.

The organic silicon compound (E) is blended in an amount of 0 to about 10 parts, preferably about 0.05 to 10 parts, more preferably about 0.5 to 5 parts by weight per 100 parts by weight of component (A). Less than 0.05 parts of the organic silicon compound would not be effective for its purpose whereas more than 10 parts would sometimes adversely affect the heat resistance and other physical properties of cured products.

If desired, any of additives commonly used in conventional silicone rubber compositions may be added to the composition of the present invention. Such additives include dispersants such as low molecular weight siloxanes having a degree of polymerization of up to 100, silanol-containing silane, and alkoxy-containing silanes; heat resistance enhancers such as iron oxide, cerium oxide, and iron octylate; pigments; and reinforcing fillers in the form of silica fine powder such as fumed silica and wet silica which may or may not be surface treated to be hydrophobic, group quarts, diatomaceous earth. Also useful are saturated aliphatic hydrocarbons such as isoparaffin solvent for imparting processability and moldability to the composition; mold release agents such as fatty acid metal salts and fatty acid amides; blowing agents such as azodicarbonamide and azobisisobutyronitrile; and other well-known additives used in conventional silicone rubber compositions.

Additionally the conductive silicone rubber composition of the present invention may further contain at least one additive selected from the group consisting of a fatty acid of formula (6), an acid anhydride resulting from molecular condensation of the fatty acid, and an acid anhydride of formula (7).

$$R^5(COOH)_k \qquad (6)$$

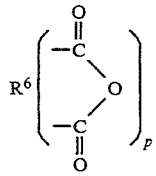  (7)

In formula (6), $R^5$ is a hydrogen atom or a saturated or unsaturated, substituted or unsubstituted hydrocarbon group having 1 to 30 carbon atoms and k is an integer of 1 to 10. In formula (7), $R^6$ is a saturated or unsaturated, substituted or unsubstituted, polyvalent hydrocarbon group having 1 to 30 carbon atoms and p is an integer of 1 to 3. With respect to these acids, reference is made to JP-A 25393/1993, U.S. Ser. No. 07/915,176 and EP 0524046, which is incorporated herein by reference.

The composition of the invention may be prepared by uniformly mixing predetermined amounts of essential components (A) to (D) and optional component (E). Although the order of addition of these components is not critical, it is preferred to prepare the composition by first mixing organopolysiloxane (A) with conductive carbon black (B), adding organic peroxide (C) and component (D) to the mixture, and finally adding component (E), if desired, while kneading or milling the mixture at respective stages in a Banbury mixer or roll mill.

The thus prepared conductive silicone rubber composition of the present invention may be molded by any desired technique such as compression molding, injection molding, and calendering techniques and vulcanized by an atmospheric hot air vulcanization (HAV) technique whereby the composition is converted into an elastomer. Vulcanization is generally carried out with hot air at temperatures of 100° to 500° C. for 5 seconds to 10 minutes although vulcanization may be accomplished even at lower temperatures if the time is extended. Also the HAV technique may be modified by combining hot air with heating by infrared heaters or with UHF heating by taking advantage of the increased UHF absorption of the composition due to carbon black blended therein.

In this way, the composition is molded and cured into a conductive silicone rubber which is a void-free, surface tack-free, heat resistant elastomer. Therefore, the conductive silicone rubber composition of the invention is advantageously used for the manufacture of EMI shielding gaskets, building gaskets, conductive roll members such as charging rolls, transfer rolls, developing rolls, paper feed rolls, and fixing rolls, and the like. Particularly, the conductive silicone rubber composition can be continuously molded by employing HAV and therefore can be molded into a long article.

EXAMPLE

Examples of the present invention are given below by way of illustration and not by way of limitation. All parts are by weight and the viscosity is measured at 25° C.

Examples 1–7 & Comparative Example 1

Several silicone rubber compositions were prepared by kneading 100 parts of an organopolysiloxane comprised of 99.7 mol % of dimethylsiloxane units and 0.275 mol % of methylvinylsiloxane units, blocked with 0.025 mol % of a dimethylvinylsilyl group at either end of its molecular chain, and having a viscosity of $1 \times 10^7$ cs, 40 parts of acetylene black, and 1 part of cerium oxide in a pressure kneader to form a base compound, and then adding amounts of an organic peroxide and an additive to 100 parts of the base compound as shown in Table 1.

These compositions were then measured for plasticity in accordance with JIS C-2123. Each of the compositions was shaped into a sheet which was covered with a polyethylene sheet and allowed to stand for 1 and 3 days at room temperature before the sheet was similarly measured for plasticity and examined for workability by an extrusion test.

Separately, each of the silicone rubber compositions was extruded into a rod of 5 mm in diameter by means of an extruder having a diameter of 40 mm and passed through a HAV tower having a height of about 1 m at a temperature of 250° C., thereby accomplishing HAV within a residence time of 5 minutes.

The resulting conductive silicone rubbers were examined for surface tack, hardness (JIS A scale), tensile strength and elongation in accordance with JIS K-6301.

The results are shown in Table 1.

TABLE 1

| | Example | | | | Comparative | Example | | |
|---|---|---|---|---|---|---|---|---|
| | 1 | 2 | 3 | 4 | Example 1 | 5 | 6 | 7 |
| Composition | | | | | | | | |
| Base compound | 100 | 100 | 100 | 100 | 100 | 100 | 100 | 100 |
| Organic peroxide 1 | 1.5 | | 1.5 | 1.5 | 1.5 | 1.5 | 1.5 | 1.5 |
| Organic peroxide 2 | | 1.5 | | | | | | |
| Additive A | 0.5 | 0.5 | | | | 0.2 | 1.0 | 5.0 |
| Additive B | | | 0.5 | | | | | |
| Additive C | | | | 0.5 | | | | |
| Compound's Initial | 250 | 253 | 247 | 249 | 250 | 252 | 247 | 243 |
| plasticity   1 day | 283 | 285 | 279 | 285 | 420 | 300 | 261 | 255 |
| (JIS C-2133) 3 days | 301 | 305 | 293 | 303 | 700 | 380 | 276 | 270 |
| Extrusion molding | extrudable after 3 days | extrudable after 3 days | extrudable after 3 days | extrudable after 3 days | not extrudable after 1 day | extrudable after 3 days | extrudable after 3 days | extrudable after 3 days |
| Physical properties | | | | | | | | |

TABLE 1-continued

| | Example 1 | Example 2 | Example 3 | Example 4 | Comparative Example 1 | Example 5 | Example 6 | Example 7 |
|---|---|---|---|---|---|---|---|---|
| Surface tack | none | none | none | none | none | none | none | tacky |
| Hardness (JIS A) | 61 | 60 | 61 | 62 | 60 | 60 | 58 | 55 |
| Tensile strength (kgf/cm$^2$) | 52 | 48 | 47 | 51 | 49 | 51 | 49 | 43 |
| Elongation (%) | 290 | 270 | 280 | 300 | 285 | 280 | 310 | 380 |

*organic peroxide 1

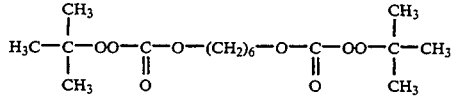

organic peroxide 2

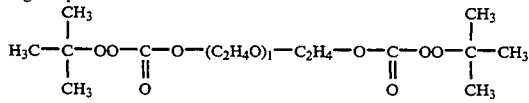

Additive A: benzotriazole
Additive B: 1,2,3-benzotriazin-4(3-3H)-one
Additive C: 1H-benzotriazol-1-ylmethyl-isocyanide As is evident from Table 1, the composition having additive A, B or C added thereto within the scope of the present invention (Examples 1–7) maintained constant plasticity, experienced no scorching and remained well workable over a long term as compared with the composition free of such a specific additive (Comparative Example).

There has been described a conductive silicone rubber composition which allows for HAV with the aid of an organic peroxide irrespective of the inclusion of carbon black and is significantly improved in shelf stability. The conductive silicone rubber resulting therefrom is free of voids or surface tack and has improved heat resistance and conductivity so that it is suitable in a variety of uses.

Japanese Patent Application No. 5-109864 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A conductive silicone rubber composition comprising:

(A) 100 parts by weight of an organopolysiloxane of general formula (1):

wherein R$^1$ groups, which may be identical or different, are in each case selected from substituted or unsubstituted monovalent hydrocarbon groups and letter a is a positive number of 1.90 to 2.05;

(B) 5 to 100 parts by weight of conductive carbon black;

(C) 0.1 to 5 parts by weight of at least one organic peroxide selected from general formulae (2) and (3):

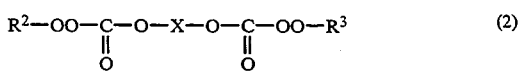

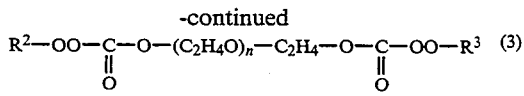

wherein X is a group of formula (4) or (5):

wherein m is an integer of 2 to 8,
   R$^2$ and R$^3$ are independently a monovalent hydrocarbon group having 3 to 10 carbon atoms or a group —SiR$_3^4$,
   R$^4$ is a methyl, ethyl or phenyl group, and
   letter n is an integer of 1 to 4; and (D) 0.01 to 5 parts by weight of a compound having a group —N=N—, based on the total of components (A), (B) and (C);

wherein said composition is capable of being fully cured by normal pressure, hot air vulcanization.

2. A composition of claim 1, wherein said compound having a group —N=N— is selected from the group consisting of benzotriazole, benzotriazole 5-carboxylic acid, 1,2,3-benzotriazin 4(3H)-one, N—(1H) -benzotriazole-1-ylmethyl-formamide, 1H -benzotriazol -1-ylmethyl-isocyanide, and a mixture thereof.

3. The composition of claim 1 wherein said compound having a group —N=N— is benzotriazole.

4. A composition according to claim 1, wherein R$^1$ is an unsubstituted monovalent hydrocarbon group having 1–10 C atoms or a monovalent hydrocarbon group having 1–10 C atoms and substituted by halogen atoms or cyano groups.

5. A composition according to claim 4, wherein R$^1$ is methyl, ethyl, propyl, butyl, vinyl, allyl, butenyl, phenyl, tolyl, chloromethyl, chloropropyl, 3,3,3-trifluoropropyl or 2-cyanoethyl.

6. A composition according to claim 1, wherein said organopolysiloxane of formula (1) is blocked at the end of its molecular chain by a triorganosilyl group or hydroxyl group.

7. A composition according to claim 6, wherein said organopolysiloxane of formula (1) is blocked at either end of its molecular chain by (CH$_2$=CH) R$^1$Si- or (CH$_2$=CH)$_3$Si-.

8. A composition according to claim 1, wherein said organopolysiloxane of formula (1) has a viscosity of at least 300 centistokes at 25° C.

9. A composition according to claim 1, wherein said organopolysiloxane of formula (1) has a viscosity of at least 100,000 centistokes at 25° C.

10. A composition according to claim 1, wherein said conductive carbon black is acetylene black.

11. A composition according to claim 1, wherein said composition contains 10-70 parts by weight of conductive carbon black per 100 parts by weight of said organopolysiloxane.

12. A composition according to claim 1, wherein R$^2$ and R$^3$ are each independently n-propyl, isopropyl, t-butyl, n-butyl, n-amyl, t-amyl, hexyl, heptyl, octyl, 2-ethylpropyl, 2-ethylbutyl, 2-ethylhexyl, cumyl, trimethylsilyl, triethylsilyl or triphenylsilyl.

13. A composition according to claim 5, wherein R$^2$ and R$^3$ are each independently n-propyl, isopropyl, t-butyl, n-butyl, n-amyl, t-amyl, hexyl, heptyl, octyl, 2-ethylpropyl, 2-ethylbutyl, 2-ethylhexyl, cumyl, trimethylsilyl, triethylsilyl or triphenylsilyl.

14. A composition according to claim 2, wherein
R$^1$ is an unsubstituted monovalent hydrocarbon group having 1—10 C atoms or a monovalent hydrocarbon group having 1-10 C atoms and substituted by halogen atoms or cyano groups, and
R$^2$ and R$^3$ are each independently methyl, ethyl, propyl, butyl, vinyl, allyl, butenyl, phenyl, tolyl, chloromethyl, chloropropyl, 3,3,3-trifluoropropyl or 2-cyanoethyl.

15. A composition according to claim 3, wherein
R$^1$ is an unsubstituted monovalent hydrocarbon group having 1-10 C atoms or a monovalent hydrocarbon group having 1-10 C atoms and substituted by halogen atoms or cyano groups, and
R$^2$ and R$^3$ are each independently methyl, ethyl, propyl, butyl, vinyl, allyl, butenyl, phenyl, tolyl, chloromethyl, chloropropyl, 3,3,3-trifluoropropyl or 2-cyanoethyl.

16. A composition according to claim 1, wherein said composition contains 0.1-2 parts by weight of said compound having a group —N=N— per 100 parts by weight of the total of components (A), (B) and (C).

17. A composition according to claim 1, wherein said composition further contains an organic silicone compound having at least one hydrogen atom directly bonded to a silicon atom.

18. A composition according to claim 1, wherein said composition further contains at least one additive selected from the group consisting of a fatty acid of the following formula (6), an acid anhydride resulting from molecular condensation of a fatty acid according to formula (6), or an acid anhydride of the following formula (7)

 (6)

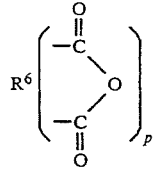 (7)

wherein
R$^5$ is hydrogen or a saturated or unsaturated, substituted or unsubstituted hydrocarbon group having 1-30 C atoms,
k is an integer of 1 to 10,
R$^6$ is a saturated or unsaturated, substituted or unsubstituted polyvalent hydrocarbon group having 1-30 C atoms, and
p is an integer of 1 to 3.

19. A composition according to claim 1, wherein said at least one organic peroxide is of formula (3).

20. A conductive silicone rubber composition comprising:
(A) 100 parts by weight of an organopolysiloxane of general formula (1):

$$R_a^1SiO_{(4-a)/2} \qquad (1)$$

wherein R$^1$ groups, which may be identical or different, are in each case selected from substituted or unsubstituted monovalent valent hydrocarbon groups and letter a is a positive number of 1.90 to 2.05;
(B) 5 to 100 parts by weight of conductive carbon black;
(C) 0.1 to 5 parts by weight of at least one organic peroxide selected from general formulae (2) and (3):

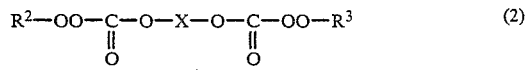 (2)

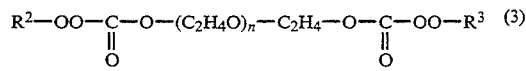 (3)

wherein X is a group of formula (4) or (5):

 (4)

 (5)

wherein m is an integer of 2 to 8,
R$^2$ and R$^3$ are independently a monovalent hydrocarbon group having 3 to 10 carbon atoms or a group —SiR$_3^4$,
R$^4$ is a methyl, ethyl or phenyl group, and
letter n is an integer of 1 to 4; and
(D) 0.01 to 5 parts by weight of a compound having a group —N=N—, based on the total of components (A), (B) and (C);
wherein the polysiloxanes present within said composition consist of organopolysiloxanes of formula I.

21. A conductive silicone rubber composition comprising:
(A) 100 parts by weight of an organopolysiloxane of general formula (1):

$$R_a^1SiO_{(4-a)} \qquad (1)$$

wherein R$^1$ groups, which may be identical or different, are in each case selected from substituted or unsubstituted monovalent hydrocarbon groups and letter a is a positive number of 1.90 to 2.05;

(B) 5 to 100 parts by weight of conductive carbon black;

(C) 0.1 to 5 parts by weight of at least one member selected from organic peroxides of general formulae (2) and (3):

$$R^2-OO-\underset{\underset{O}{\|}}{C}-O-X-O-\underset{\underset{O}{\|}}{C}-OO-R^3 \quad (2)$$

$$R^2-OO-\underset{\underset{O}{\|}}{C}-O-(C_2H_4O)_n-C_2H_4-O-\underset{\underset{O}{\|}}{C}-OO-R^3 \quad (3)$$

wherein X is a group of formula (4) or (5):

$$-(CH_2)_m- \quad (4)$$

$$\begin{array}{c} CH_3 \\ | \\ -CH_2-C-CH_2- \\ | \\ CH_3 \end{array} \quad (5)$$

wherein m is an integer of 2 to 8, $R^2$ and $R^3$ are independently a monovalent hydrocarbon group having 3 to 10 carbon atoms or a group $-SiR_3^4$, $R^4$ is a methyl, ethyl or phenyl group, and letter n is an integer of 1 to 4; and (D) 0.01 to 5 parts by weight of a compound having a group $-N=N-$, based on the total of components (A), (B) and (C), wherein said composition does not rely on addition vulcanization, and said composition is capable of being fully cured by normal pressure, hot air vulcanization.

* * * * *